(12) United States Patent
Kiefer et al.

(10) Patent No.: US 9,350,811 B1
(45) Date of Patent: May 24, 2016

(54) LOAD BALANCING NETWORKS AND LOAD BALANCING METHODS

(71) Applicant: Nectar Services Corp., Farmingdale, NY (US)

(72) Inventors: Matthew R. Kiefer, Staten Island, NY (US); Daniel P. Martin, Williamsville, NY (US); Edmond Baydian, Massapequa, NY (US)

(73) Assignee: Nectar Services Corp., Farmingdale, NY (US)

( * ) Notice: Subject to any disclaimer, the term of this patent is extended or adjusted under 35 U.S.C. 154(b) by 0 days.

(21) Appl. No.: 13/844,082

(22) Filed: Mar. 15, 2013

Related U.S. Application Data

(60) Provisional application No. 61/620,231, filed on Apr. 4, 2012, provisional application No. 61/620,238, filed on Apr. 4, 2012, provisional application No. 61/620,243, filed on Apr. 4, 2012.

(51) Int. Cl.
*H04L 29/06* (2006.01)
*H04L 29/08* (2006.01)

(52) U.S. Cl.
CPC .................................. *H04L 67/141* (2013.01)

(58) Field of Classification Search
CPC .............. H04L 29/06; H04L 29/08576; H04L 29/08072; H04L 29/0809; H04L 29/06095
See application file for complete search history.

(56) References Cited

U.S. PATENT DOCUMENTS

| | | | |
|---|---|---|---|
| 5,568,471 A | 10/1996 | Hershey | |
| 5,822,523 A | 10/1998 | Rothschild | |
| 6,145,001 A | 11/2000 | Scholl | |
| 6,363,421 B2 | 3/2002 | Barker | |
| 6,581,108 B1 | 6/2003 | Denison | |
| 6,643,661 B2 | 11/2003 | Polizzi | |
| 6,782,420 B1 | 8/2004 | Barrett | |

(Continued)

FOREIGN PATENT DOCUMENTS

| | | |
|---|---|---|
| WO | 9946692 A2 | 9/1999 |
| WO | 0175633 A1 | 10/2001 |

OTHER PUBLICATIONS

S. H. Schwartz and D. Zager. Value-Oriented Network Management. IEEE, 2000.

(Continued)

*Primary Examiner* — Vivek Srivastava
*Assistant Examiner* — Hien Doan
(74) *Attorney, Agent, or Firm* — Ronald Abramson; Lewis Baach pllc

(57) ABSTRACT

A network may comprise a plurality of nodes wherein each of the plurality of nodes is associated with one of a plurality of hives. A computer may connect to the network by establishing node data for each of the plurality of nodes, the node data indicating a hive with which the node is associated and including a flag indicating whether a connection attempt associated with the node is or has been unsuccessful. When a connection attempt is successful, the computer may determine whether the node to which the computer is connected is a preferred node associated with the preferred hive based on the node data. The computer may connect to the preferred node associated with the preferred hive when the node to which the computer is connected is not the preferred node associated with the preferred hive and the preferred node associated with the preferred hive is not marked unsuccessful.

1 Claim, 9 Drawing Sheets

(56) References Cited

U.S. PATENT DOCUMENTS

| | | |
|---|---|---|
| 6,986,147 B2 | 1/2006 | Gooding |
| 7,039,674 B1 | 5/2006 | Cha |
| 7,058,423 B1 | 6/2006 | Ahmavaara |
| 7,130,854 B2 | 10/2006 | Beadles |
| 7,177,917 B2 | 2/2007 | Giotta |
| 7,302,469 B2 | 11/2007 | Motoyama |
| 7,328,145 B2 | 2/2008 | Jackson |
| 7,414,663 B2 | 8/2008 | Hoshino |
| 7,417,663 B2 | 8/2008 | Yang |
| 7,612,654 B2 | 11/2009 | Bender |
| 2001/0046209 A1 | 11/2001 | Glassman |
| 2002/0118396 A1 | 8/2002 | Kawai |
| 2002/0165982 A1 | 11/2002 | Leichter |
| 2002/0178235 A1 | 11/2002 | Ueno |
| 2003/0225839 A1 | 12/2003 | Kopunovic |
| 2004/0015540 A1 | 1/2004 | Solano |
| 2004/0172465 A1 | 9/2004 | Shuster |
| 2005/0093501 A1 | 5/2005 | Takahashi |
| 2005/0102382 A1 | 5/2005 | MacGregor |
| 2005/0114550 A1 | 5/2005 | Kushnick |
| 2005/0220096 A1 | 10/2005 | Friskney |
| 2005/0271047 A1 | 12/2005 | Huonder |
| 2006/0007944 A1 | 1/2006 | Movassaghi |
| 2006/0029083 A1 | 2/2006 | Kettlewell |
| 2006/0109797 A1 | 5/2006 | Ishida |
| 2006/0182123 A1 | 8/2006 | Monette |
| 2006/0211420 A1 | 9/2006 | Ophir |
| 2006/0218267 A1 | 9/2006 | Khan |
| 2007/0011302 A1 * | 1/2007 | Groner et al. .................. 709/224 |
| 2007/0081530 A1 | 4/2007 | Nomura |
| 2007/0143842 A1 | 6/2007 | Turner |
| 2007/0150597 A1 | 6/2007 | Hasan |
| 2007/0165540 A1 | 7/2007 | Elias |
| 2008/0049621 A1 | 2/2008 | McGuire |
| 2008/0071893 A1 | 3/2008 | Ohhira |
| 2008/0228908 A1 | 9/2008 | Link |
| 2008/0297307 A1 | 12/2008 | Parker |
| 2009/0016270 A1 | 1/2009 | Tsirtsis (Georgios) |
| 2009/0177863 A1 | 7/2009 | Rehman |

OTHER PUBLICATIONS

Ohta (Tokoyo Institute of Technology), Provider Independet IPv6 Addressing Architecture, Internet Draft, Mar. 1995, Japan.
Ferguson et al, WebSphere as an e-business server, IBM Systems Journal, vol. 40, No. 1,2001, US.
Waldbusser, Remote Network Monitoring Management Information Base, Internet Draft, Oct. 8, 2003, Version 2 , Femont California/US.
Solarwinds, ARNOC Solves Network Management Challenge by Extending Orion Network Performance Monitor Capabilities Across Various Network Topologies, 2006, US.

* cited by examiner

LOAD BALANCING NETWORKS AND LOAD BALANCING METHODS

CROSS REFERENCE TO RELATED APPLICATIONS

This application claims the benefit of the filing date of the following U.S. provisional patent applications: Ser. No. 61/620,231, Ser. No. 61/620,238 and Ser. No. 61/620,243, each of which was filed on Apr. 4, 2012, and incorporates by reference each of said applications in their entirety.

FIELD OF THE DISCLOSURE

The present disclosure is in the field of computer and/or telecommunications network management.

BACKGROUND OF THE RELATED ART

Numerous tools exist for monitoring and managing events on a network. Such tools are used extensively in Network Operations Centers (NOCs). Available tools use, for example, Simple Network Management Protocol (SNMP), command line interfaces to network components, and other access methods, go gather and present status information, event messages, and alarms from the various elements deployed throughout a network. Typically, the element information collected in this manner is presented on one or more consoles in the NOC.

As element information from managed network domains are collected and aggregated, it is forwarded to higher level network control elements, where data from a plurality of network segments and domains may be concentrated. The volume of data involved in this process may be sufficiently large that a plurality of processors are required to handle it. One problem that has arisen in such installations is that of efficiently and reliably balancing the processing workload among these higher-level control elements.

SUMMARY OF THE DISCLOSURE

In one aspect of the disclosure, a network may comprise a plurality of nodes wherein each of the plurality of nodes is associated with one of a plurality of hives.

In such aspect, a computer may connect to the network by establishing node data for each of the plurality of nodes, the node data indicating a hive with which the node is associated and including a flag indicating whether a connection attempt associated with the node is or has been unsuccessful. When a connection attempt is successful, the computer may determine whether the node to which the computer is connected is a preferred node associated with the preferred hive based on the node data. The computer may connect to the preferred node associated with the preferred hive when the node to which the computer is connected is not the preferred node associated with the preferred hive and the preferred node associated with the preferred hive is not marked unsuccessful.

In one embodiment, a method for connecting to a network comprises a plurality of nodes wherein each of the plurality of nodes is associated with one of a plurality of hives, the method comprising: establishing, with a computer, node data for each of a plurality of nodes, the node data indicating a hive with which the node is associated and including a flag indicating whether a connection attempt associated with the node is or has been unsuccessful; determining, with the computer, a preferred hive, wherein the determining is based on the node data and/or a designation of a preferred hive stored in a memory; attempting, with a computer, to connect to one of the plurality of nodes that is not flagged as unsuccessful via a network connection when less than all of the nodes are flagged as unsuccessful; marking, with the computer, the flag for the one of the plurality of nodes as unsuccessful when the connection attempt is unsuccessful; determining, with the computer, whether the node to which the computer is connected is a preferred node associated with the preferred hive when the connection attempt is successful, wherein the determining is based on the node data; determining, with the computer, whether a node associated with the preferred hive is not marked unsuccessful when the node to which the computer is connected is not the preferred node associated with the preferred hive; and connecting, with the computer, to the preferred node associated with the preferred hive when the node to which the computer is connected is not the preferred node associated with the preferred hive and the preferred node associated with the preferred hive is not marked unsuccessful.

In some embodiments, the node data is obtained via a network connection.

Some embodiments further comprise designating, with the computer, a priority of the hive associated with the node to which the computer is connected as a highest priority when the connection attempt is successful.

In some embodiments, designating the priority of the hive associated with the node to which the computer is connected as the highest priority causes the hive associated with the node to which the computer is connected to be the preferred hive.

In some embodiments, determining the preferred hive comprises designating a hive as the preferred hive at random.

Some embodiments further comprise setting, with the computer, each of the flags as not unsuccessful when each of the flags is flagged as unsuccessful.

In some embodiments, establishing node data comprises receiving node data from the node to which the computer is connected.

In some embodiments, the node data comprises a number of active connections for at least one of the plurality of nodes.

Some embodiments further comprise receiving, with the computer, a command from the node to which the computer is connected, the command comprising an instruction to disconnect from the node to which the computer is connected.

Some embodiments further comprise disconnecting, with the computer, from the node to which the computer is connected; and marking, with the computer, the node to which the computer is connected as unsuccessful.

In some embodiments, the node data is stored in a local hive table in the memory.

Some embodiments further comprise receiving a remote hive table from the node to which the computer is connected; and incorporating, with the computer, contents of the remote hive table into the local hive table.

In another embodiment, a computer constructed and arranged to connect to a network comprising a plurality of nodes wherein each of the plurality of nodes is associated with one of a plurality of hives, the computer comprising: a memory; and a processor coupled to the memory and constructed and arranged to: establish node data for each of a plurality of nodes, the node data indicating a hive with which the node is associated and including a flag indicating whether a connection attempt associated with the node is or has been unsuccessful; determine a preferred hive, wherein the determining is based on the node data and/or the designation of a preferred hive stored in the memory; attempt to connect to one of the plurality of nodes that is not flagged as unsuccessful via a network connection when less than all of the nodes are flagged as unsuccessful; mark the flag for the one of the plurality of nodes as unsuccessful when the connection attempt is unsuccessful; determine whether the node to which the computer is connected is a preferred node associated with the preferred hive when the connection attempt is successful, wherein the determining is based on the node data; determine whether a node associated with the preferred hive is not marked unsuccessful when the node to which the computer is connected is not the preferred node associated with the preferred hive; and connect to the preferred node associated with the preferred hive when the node to which the computer is connected is not the preferred node associated with the preferred hive and the preferred node associated with the preferred hive is not marked unsuccessful.

In some embodiments, the node data is obtained via a network connection.

In some embodiments, the processor is further constructed and arranged to designate a priority of the hive associated with the node to which the computer is connected as a highest priority when the connection attempt is successful.

In some embodiments, designating the priority of the hive associated with the node to which the computer is connected as the highest priority causes the hive associated with the node to which the computer is connected to be the preferred hive.

In some embodiments, determining the preferred hive comprises designating a hive as the preferred hive at random.

In some embodiments, the processor is further constructed and arranged to set each of the flags as not unsuccessful when each of the flags is flagged as unsuccessful.

In some embodiments, establishing node data comprises receiving node data from the node to which the computer is connected.

In some embodiments, the node data comprises a number of active connections for at least one of the plurality of nodes.

In some embodiments, the processor is further constructed and arranged to receive a command from the node to which the computer is connected, the command comprising an instruction to disconnect from the node to which the computer is connected.

In some embodiments, the processor is further constructed and arranged to: disconnect from the node to which the computer is connected; and mark the node to which the computer is connected as unsuccessful.

In some embodiments, the processor is constructed and arranged to, after disconnecting: establish node data for each of the plurality of nodes; determine the preferred hive, wherein the determining is based on the node data and/or the designation of a preferred hive stored in the memory; attempt to connect to one of the plurality of nodes that is not flagged as unsuccessful via a network connection when less than all of the nodes are flagged as unsuccessful; mark the flag for the one of the plurality of nodes as unsuccessful when the connection attempt is unsuccessful; determine whether the node to which the computer is connected is a preferred node associated with the preferred hive when the connection attempt is successful, wherein the determining is based on the node data; determine whether a node associated with the preferred hive is not marked unsuccessful when the node to which the computer is connected is not the preferred node associated with the preferred hive; and connect to the preferred node associated with the preferred hive when the node to which the computer is connected is not the preferred node associated with the preferred hive and the preferred node associated with the preferred hive is not marked unsuccessful.

In some embodiments, the node data is stored in a local hive table in the memory.

In some embodiments, the processor is further constructed and arranged to: receive a remote hive table from the node to which the computer is connected; and incorporate contents of the remote hive table into the local hive table.

DETAILED DESCRIPTION OF SEVERAL EMBODIMENTS

Computers may be linked to one another via a network or networks. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers.

A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via WiFi, WiMax, or other wireless connection). Connections between computers may use any protocols, including connection oriented protocols such as TCP or connectionless protocols such as UDP. Any connection through which at least two computers may exchange data can be the basis of a network. Some networks, such as those shown in FIGS. 3A-3C, may be geographically spread out, with nodes 150 located in data centers 310 in various locations. The nodes 150 may each comprise one or more servers. Nodes 150 may be arranged into logical groups such as hives, which may correspond to data center 310 placement or may be based on some other grouping scheme. Individual computers attempting to connect to network servers may connect to one or more nodes 150 associated with a particular logical group. As will be described in greater detail below, systems and methods described herein may enable connections to be automatically distributed among various logical groups within a network. Distributing connections may enable load balancing and improve network performance.

Figure 1A:
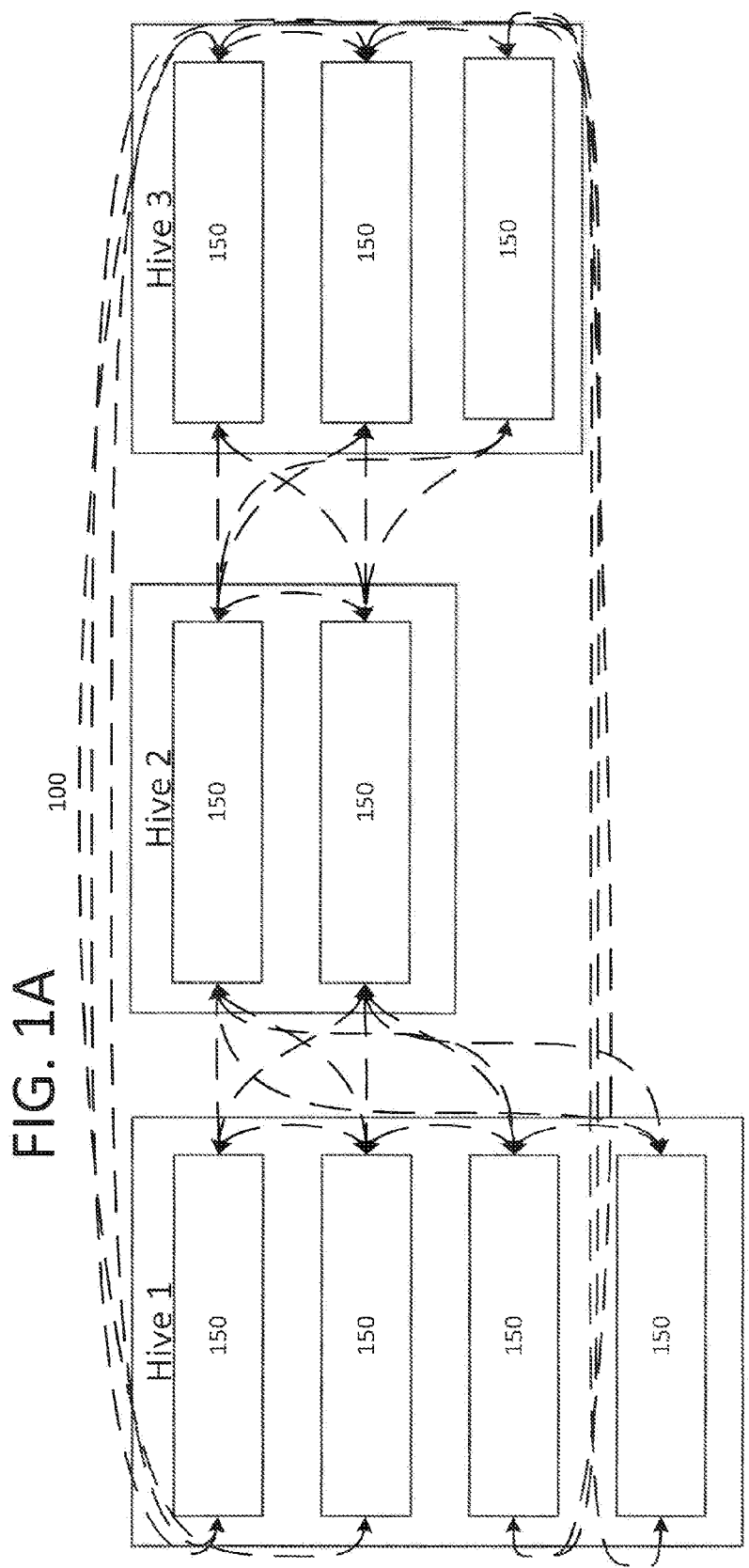
FIG. 1A depicts a network cluster according to an embodiment of the invention.
Figure 1B:
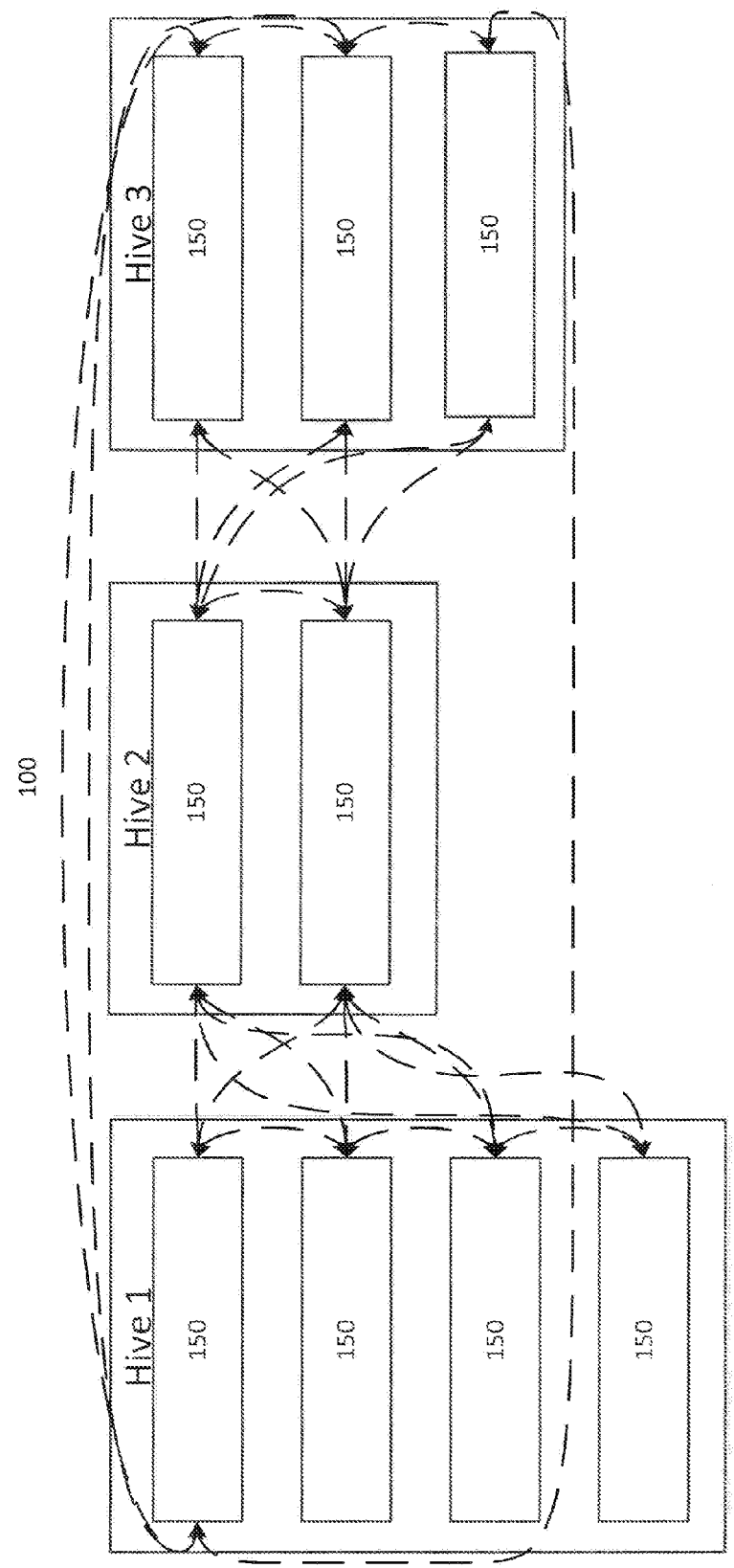
FIG. 1B depicts a network cluster according to an embodiment of the invention.

FIG. 1A depicts a network cluster 100 according to an embodiment of the invention. The cluster 100 may comprise a plurality of interconnected nodes 150. The nodes 150 may each comprise one or more servers. In this example network cluster 100, each node 150 may be directly connected to every other node 150 such that data may be transferred between any node 150 in any direction without passing through an intermediate node 150. In some cases, some nodes 150 may not have direct connections to one another. For example, FIG. 1B depicts a network cluster 100 according to an embodiment of the invention that is similar to the cluster 100 of FIG. 1A, but without direct connection between every node 150. In the case of FIG. 1B, nodes 150 that are not directly connected may maintain connections with one another by passing data through intervening nodes 150.

Figure 2:
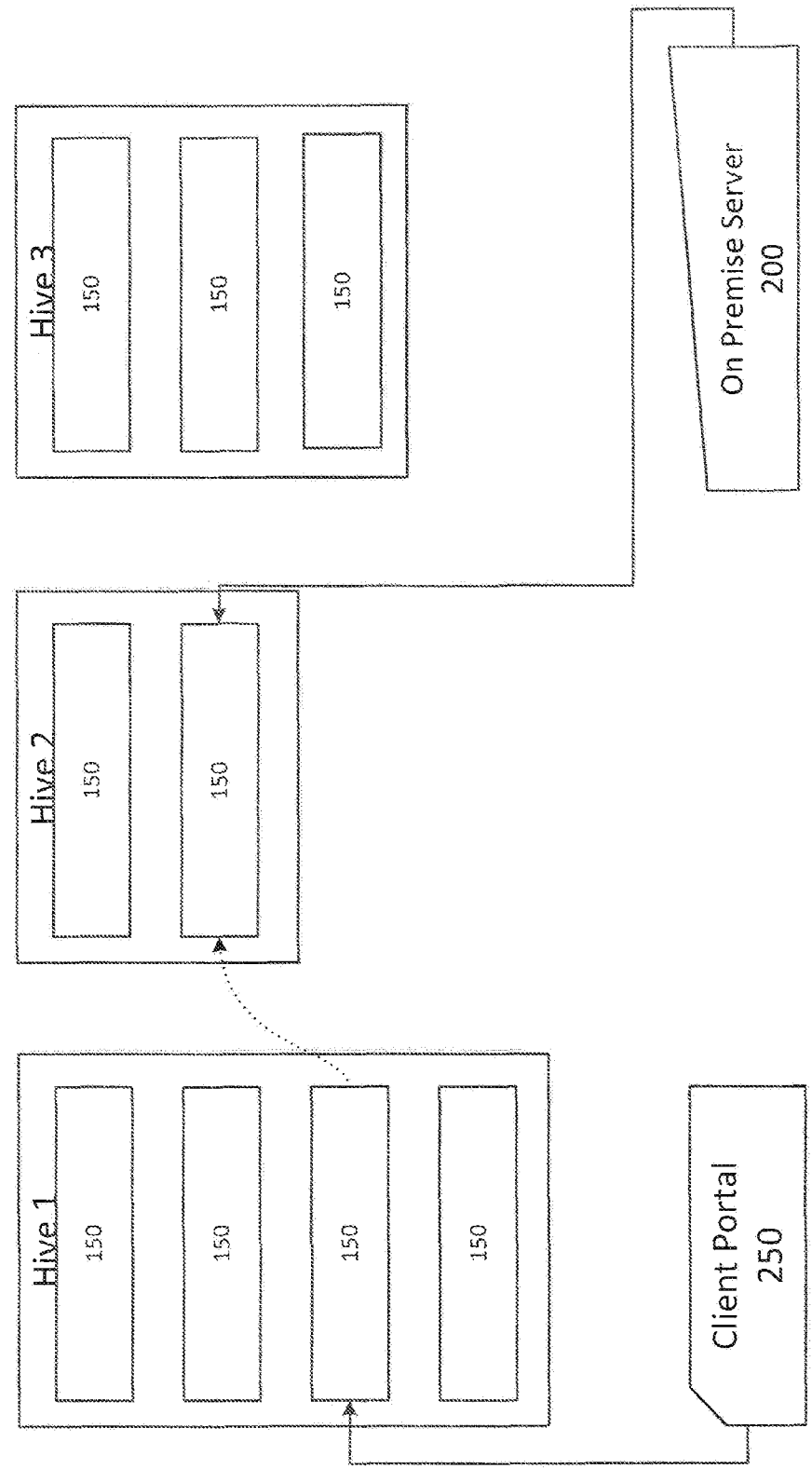
FIG. 2 depicts a network cluster including client and server connections according to an embodiment of the invention.

FIG. 2 depicts a network cluster 100 including client and server connections according to an embodiment of the invention. An on-premise server 200 (OPS) may be a server that is connected to a node 150 and logically grouped within the node 150. OPSs 200 may be physically on the premises of a facility that houses servers that are part of a node 150, or they may be geographically spread out and remotely connected. A node 150 may comprise one or more computers such as OPSs 200, and OPSs 200 connected to a node 150 may be in the same location or spread out. An individual OPS 200 may be associated with one node 150. A client 250 may be a remote computer capable of connecting to the network cluster 100. The client 250 may connect to one node 150 within the cluster 100. The client 250 may connect to the node 150 in any way, for example via the Internet or another network or through a direct or wireless connection. In embodiments wherein a client 250 connects to a node 150 via the Internet or other network, data may be shared by the client 250 and other computers within the cluster 100 without requiring additional firewall or security permissions for the client 250 beyond those necessary to access the Internet or other network.

A client 250 that is connected to a node 150 may be able to access data on any OPS 200 associated with any node 150, even a different node 150 from the one to which the client 250 is connected. For example, the client 250 may be able to communicate with the OPS 200 in FIG. 2, even though the client 250 and OPS 200 are connected to different nodes 150 within the cluster 100. Those of ordinary skill in the art will recognize that in some cases a client 250 may be restricted from accessing certain nodes 150, OPSs 200, and/or data due to access policies, security settings, or the like.

Figure 3A:
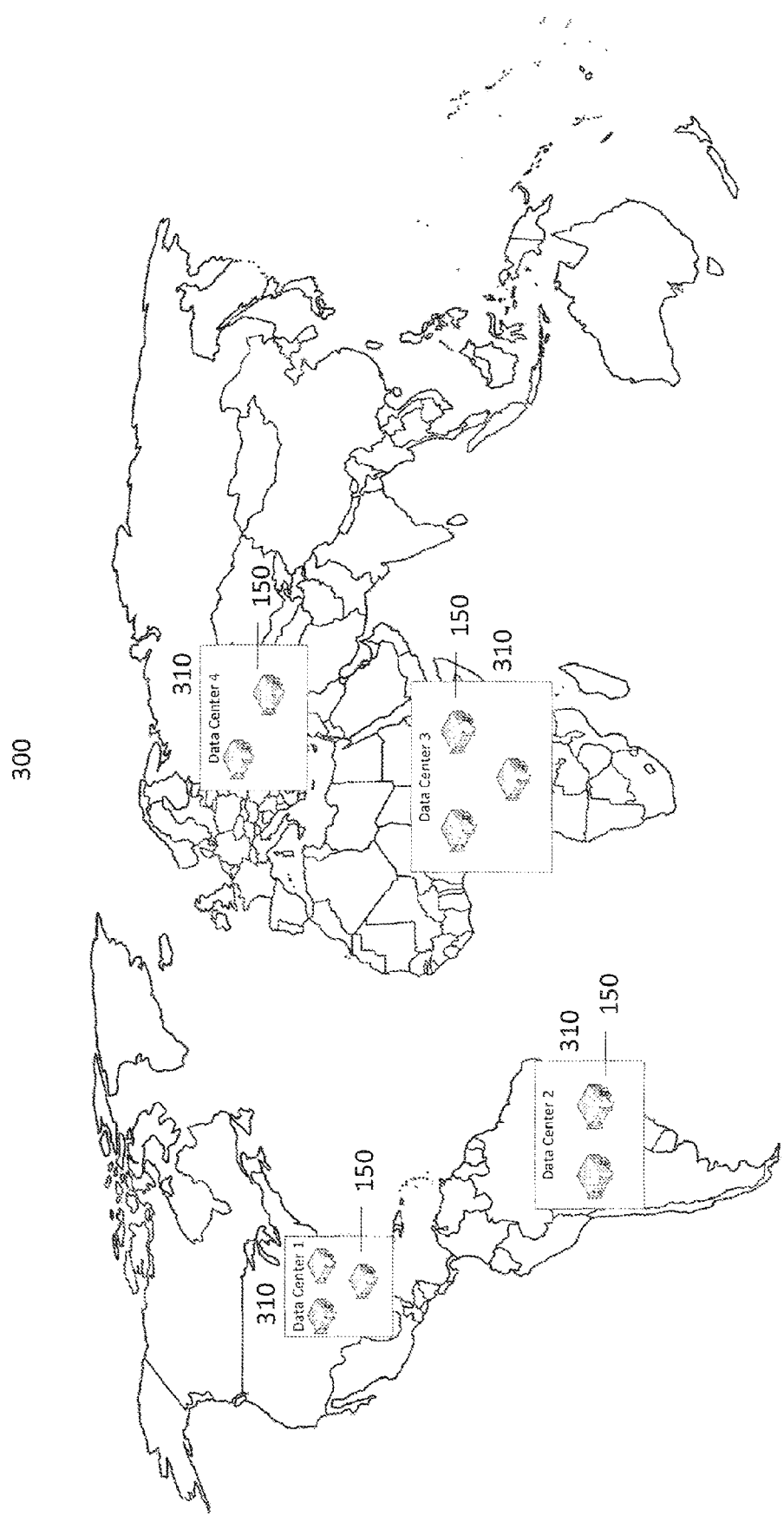
FIG. 3A depicts a plurality of network nodes according to an embodiment of the invention.
Figure 3B:
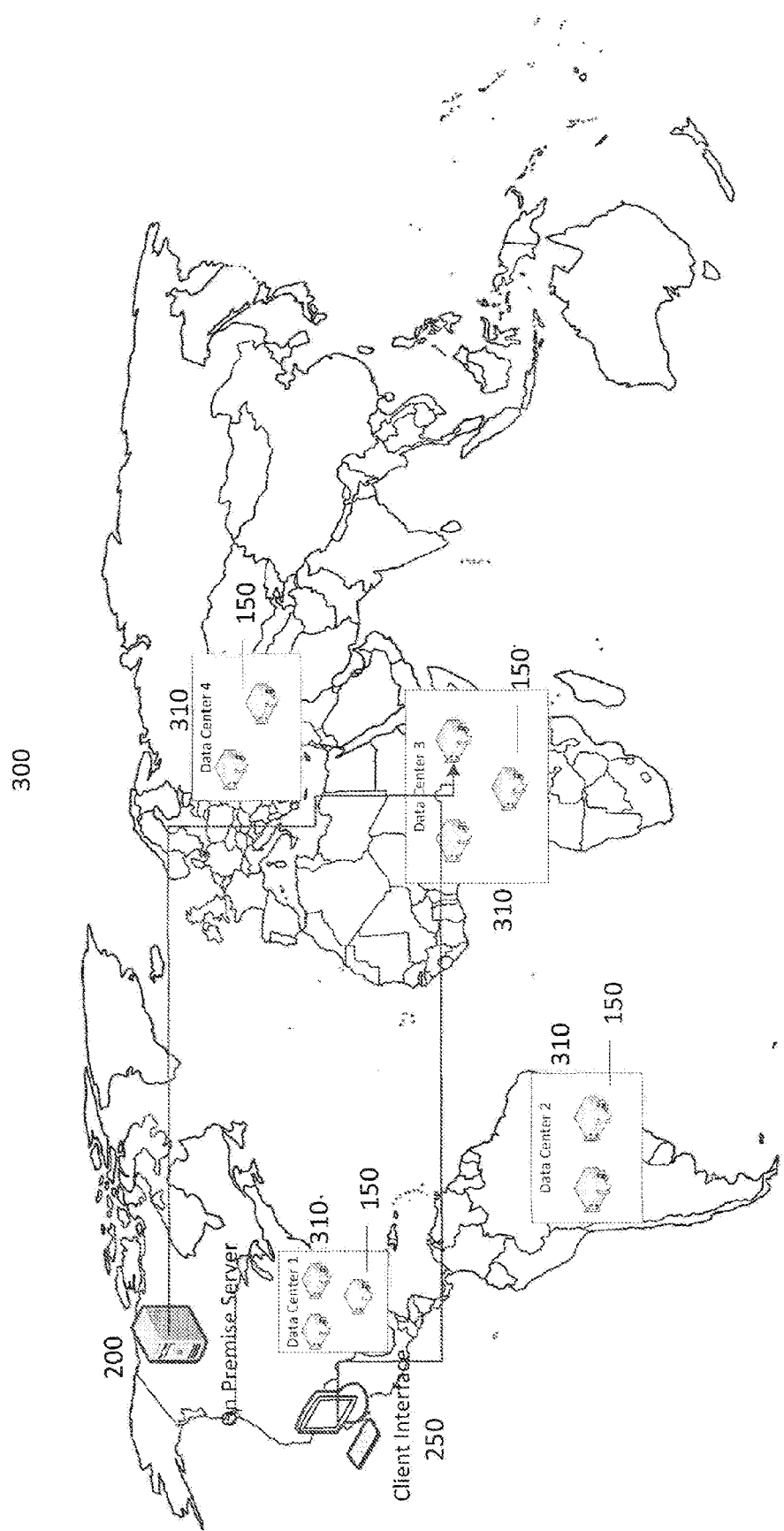
FIG. 3B depicts a plurality of network nodes including client and server connections according to an embodiment of the invention.
Figure 3C:
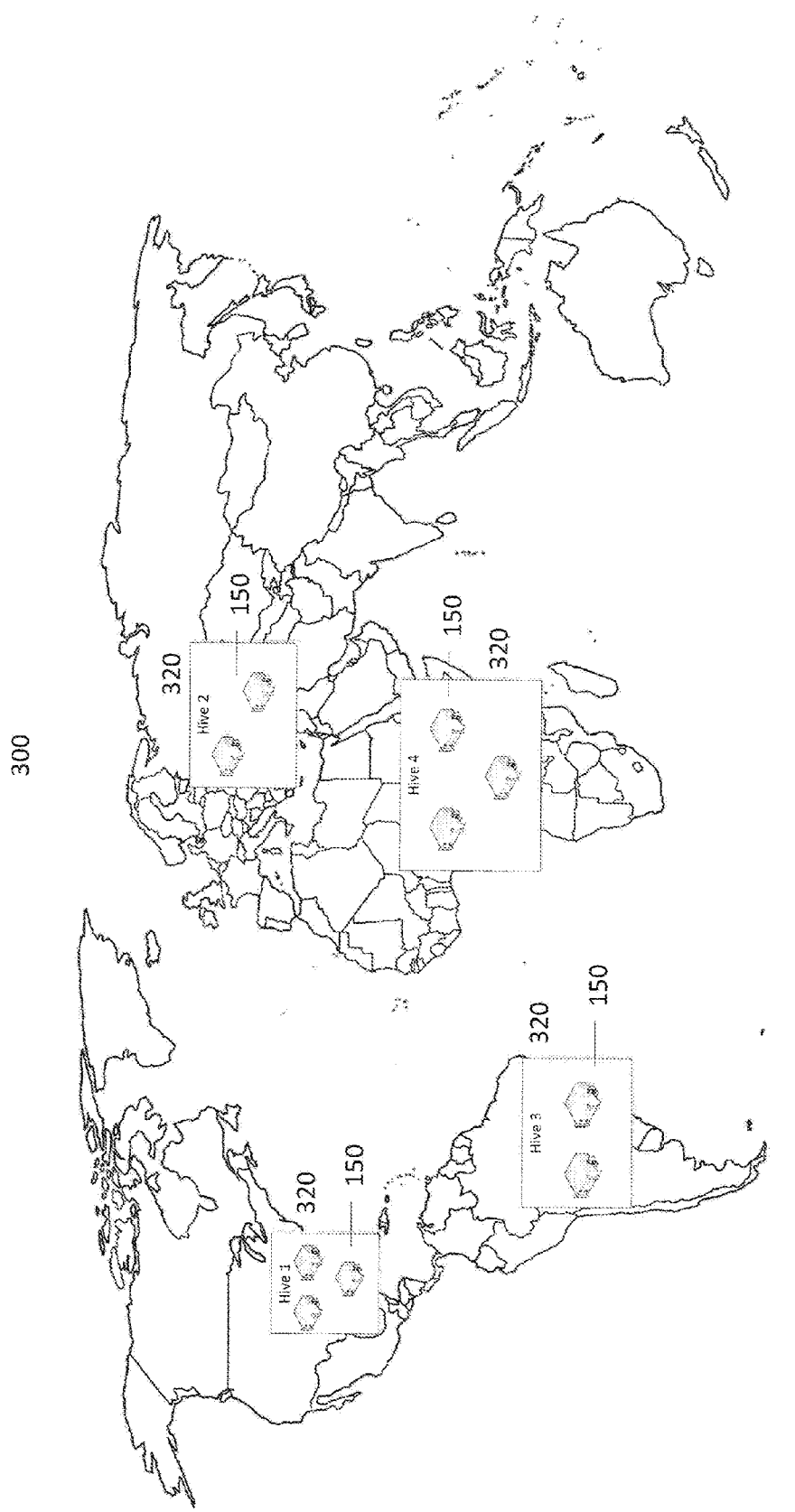
FIG. 3C depicts a plurality of network hives according to an embodiment of the invention.

FIGS. 3A-3C provide examples of networks 300 according to embodiments of the invention. FIG. 3A depicts a plurality of network nodes 150 according to an embodiment of the invention. In this example, nodes 150 are deployed within a plurality of data centers 310. The data centers 310 may be geographically spread out, as shown, and may contain any number of nodes 150. Four data centers 310, each having two or three nodes 150, are shown. However, a network 300 may comprise any number of data centers 310, and data centers 310 may comprise any number of nodes 150. The data centers 310, and the nodes 150 within, may be interconnected to one another as described with respect to FIGS. 1A-2 above or in any other way.

Spreading nodes 150 across multiple data centers 310 may provide resiliency for the network 300. If problems arise at one or more data centers 310, other data centers 310 may be capable of continued operation. As explained above with respect to FIG. 1B, nodes 150 (and therefore data centers 310) that are not directly connected due to data center 310 or node 150 problems may maintain connections with one another through intervening nodes 150.

FIG. 3B depicts a plurality of network nodes 150 including client and server connections according to an embodiment of the invention. In this example, a OPS 200 and client 250 are connected to a node 150 in a data center 310 that is not the closest data center 310. In some cases this may be a desirable situation, for example if the nearest data center 310 is heavily loaded compared to a more distant data center 310 or unavailable altogether. However, in other situations it may be desirable for OPSs 200 and clients 250 to connect to the data center 310 that is nearest to them. In some embodiments, network 300 systems and methods may enable clients 250 and/or OPSs 200 to connect to specific nodes 150 or sets of nodes 150 to optimize load balancing, performance, or other criteria.

FIG. 3C depicts a plurality of network hives 320 according to an embodiment of the invention. Hives 320 are logical groupings of nodes 150. A hive 320 grouping may be determined by an administrator or other operator, a default setting, automatically by a computer, or in any other way. A hive 320 may comprise nodes 150 grouped in any fashion, but in the example of FIG. 3C the nodes 150 in each data center 310 are grouped into hives 320. As will be described below with respect to FIGS. 4A-4C, hives 320 may be used to determine how computers connect to the network 300.

Figure 4A:
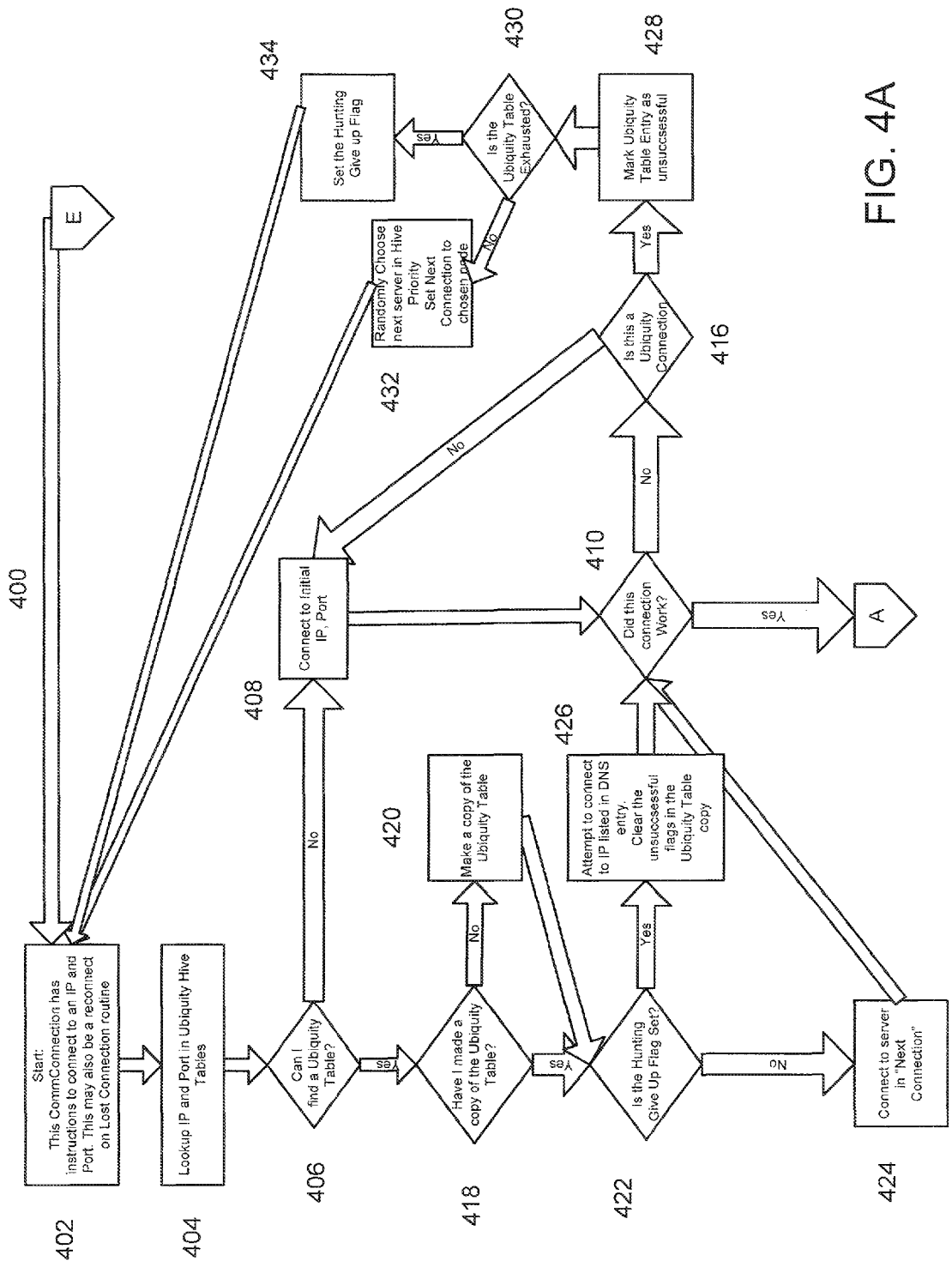
FIG. 4A depicts a network connection process according to an embodiment of the invention.
Figure 4B:
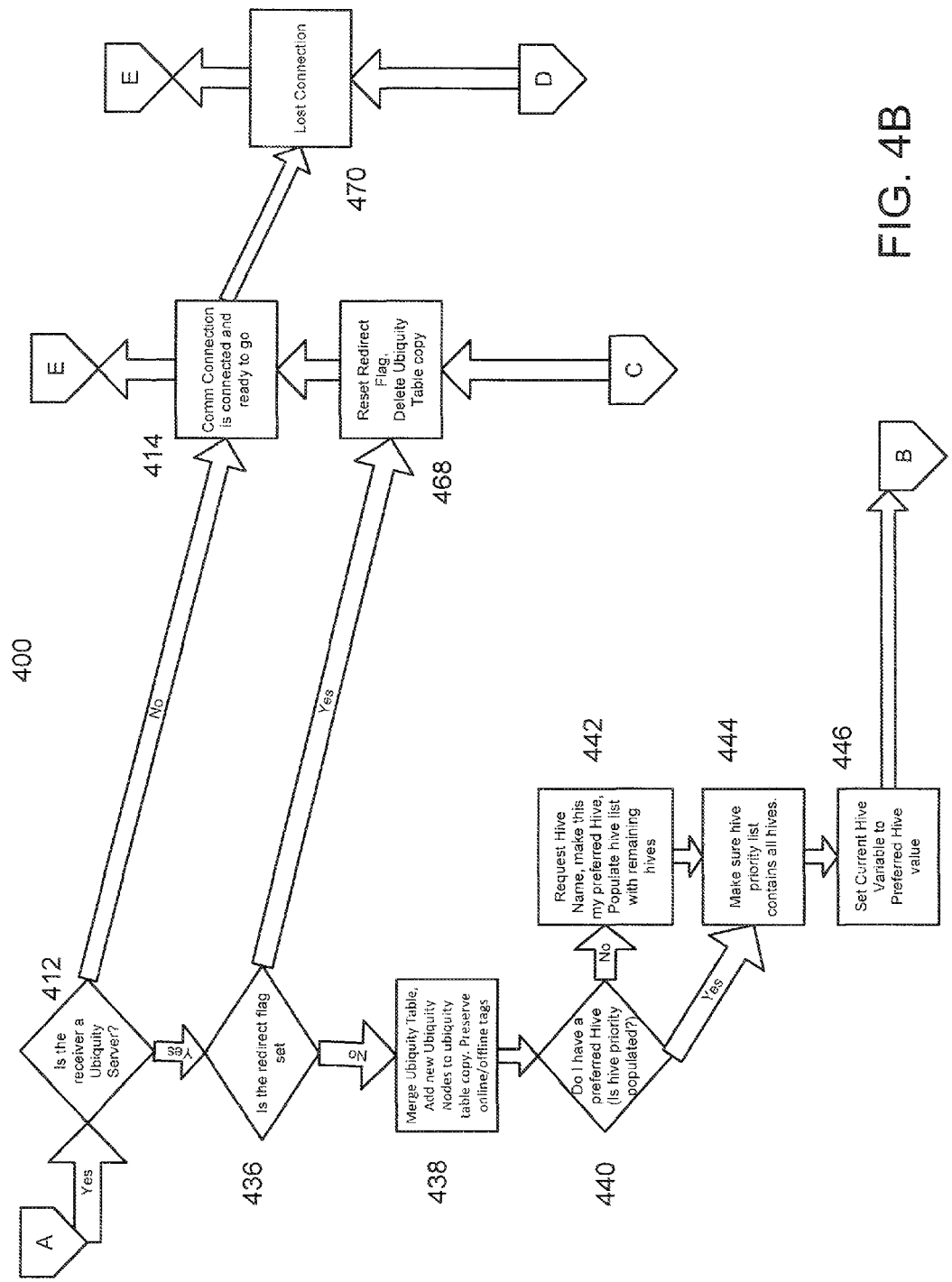
FIG. 4B depicts a network connection process according to an embodiment of the invention.
Figure 4C:
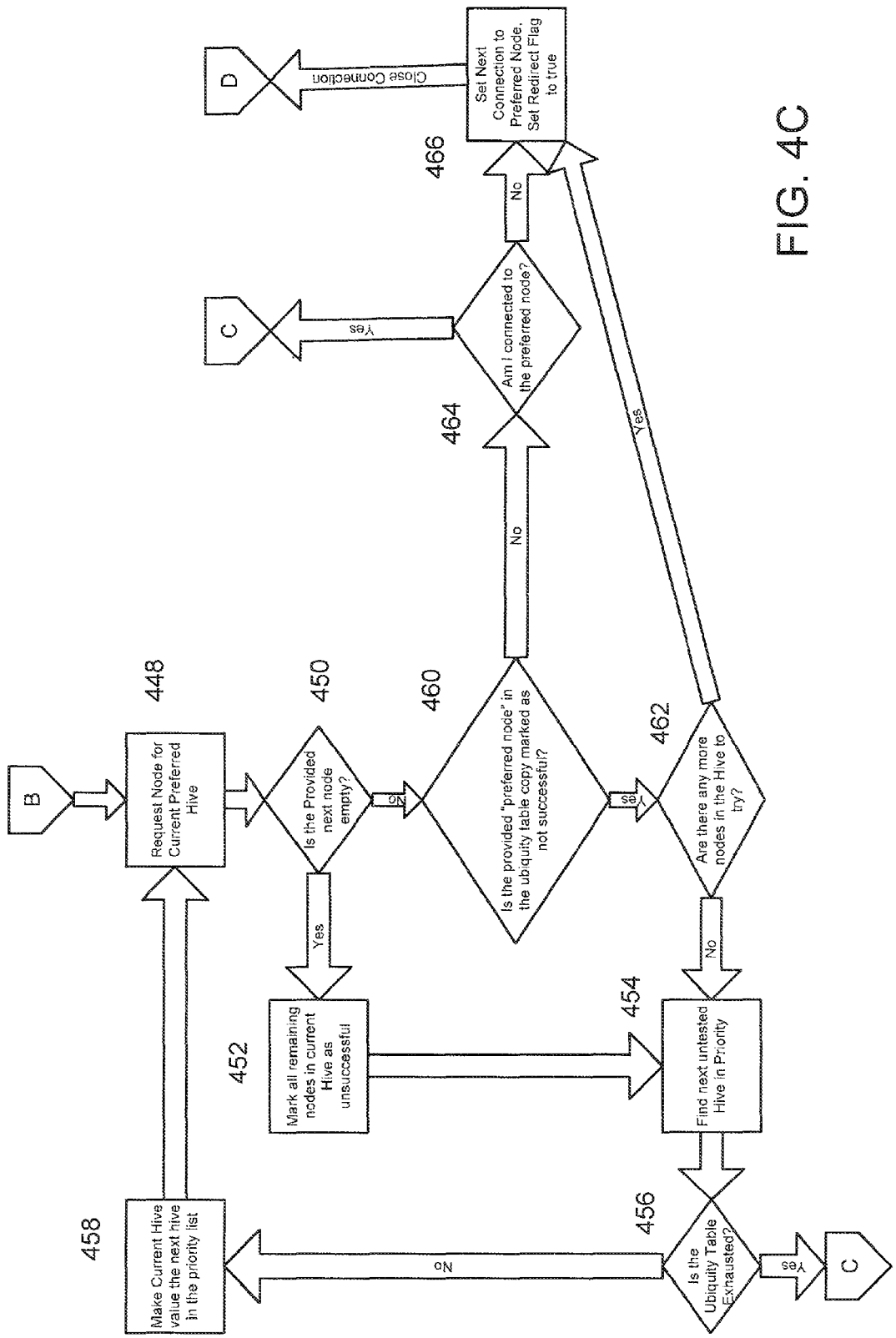
FIG. 4C depicts a network connection process according to an embodiment of the invention.

FIGS. 4A-4C depict a network connection process 400 according to an embodiment of the invention. This example process 400 is presented in the context of a OPS 200 attempting to connect to a network 300. The same or similar process may be performed by other computers such as clients 250. In some embodiments, a subset of computers in a network 300 may use the network connection process 400, while other computers do not. For example, OPSs 200 may connect to nodes 150 using this process 400 in some networks, while node 150 to node 150 connections may be established and maintained using other connection processes. The process 400 may provide a connection between the OPS 200 and network 300 that contributes to a balanced traffic distribution among OPSs 200 and/or nodes 150 in the network 300. The process 400 may enable load balancing by encouraging preferred hives 320 for computers (i.e. the hive 320 to which the computer will first try to connect) to be distributed such that individual hives 320 are not overloaded with connections while other hives 320 are underutilized. When a computer's preferred hive 320 is unavailable, the process 400 may cause it to connect to a different hive 320 such that individual hives 320 are not overloaded with connections while other hives 320 are underutilized.

A network connection process may be summarized as follows. A network may comprise a plurality of nodes 150. Each of the plurality of nodes 150 may be associated with one of a plurality of hives 320. A computer, such as a OPS 200, may start a connection process by obtaining node 150 data for each of the plurality of nodes 150. For example, the node 150 data may indicate a number of active connections associated with the node 150, a hive 320 with which the node 150 is associated, a flag indicating whether a connection attempt associated with the node 150 is unsuccessful (i.e. a "connection unsuccessful" flag), and/or other information. The OPS 200 may select a node 150 that is not flagged as unsuccessful, and the OPS 200 may attempt to connect to that node 150. If the connection attempt is unsuccessful the OPS 200 may flag the node 150 as unsuccessful. If the connection attempt is successful, the OPS 200 may determine which hive 320 in the network is its preferred hive 320. A OPS 200 may designate a hive 320 as a preferred hive 320 based on the number of active connections for each of the plurality of nodes, a designation of a preferred hive 320 stored in a memory, and/or some other criteria. When the OPS 200 has determined which is the preferred hive 320, it may check whether the node 150 to which it is connected is associated with the preferred hive 320. If the OPS 200 is connected to its preferred hive 320, it may maintain the connection. (If all computers associated with the network are connected to their preferred hives 320, load balancing may be achieved.) If the OPS 200 is not connected to its preferred hive, it may determine whether any node 150 associated with the preferred hive 320 is not marked unsuccessful. If the OPS 200 finds a node 150 associated with the preferred hive 320 that is not marked unsuccessful, it may disconnect from the current node 150 and connect to the node 150 associated with the preferred hive 320. Therefore, the OPS 200 will maintain connection with a node 150 on a non-preferred hive when the preferred hive 320 is unavailable, because connectivity may be preferred over load balancing in situations where internal or external problems make communicating with some hives 320 and/or nodes 150 impossible. The example process 400 may provide a connection method that may optimize load balancing and connectivity.

As seen in FIG. 4A, a OPS 200 may first attempt to connect to the network 300 for a first time or to reestablish connection after a previous connection is dropped intentionally or unintentionally 402. The OPS 200 may look up connection data, such as an IP address and port for a chosen or random node 150, in a hive table 404. A hive table may have any form and may contain various data in different embodiments. For example, a hive table such as the one used in this example process 400 may contain at least hive peer data and flags. Hive peer data may be included for at least one node 150, such as node 150 name, node 150 (and/or OPS 200) IP address, node 150 (and/or OPS 200) port, a number of connections currently active with the node 150, and/or the hive 320 in which the node 150 is grouped. Hive peer data may indicate, for example, an order of preferred hive 320 connections, a list of individual OPSs 200 in each hive 150, and/or other information. Flags may be included indicating a hive 320 is a preferred hive and/or that a connection to the hive 320 has been successful or unsuccessful.

Individual nodes 150 may also maintain local data such as route path data (which may be data indicating routes between nodes 150 which may be direct or indirect, as described with respect to FIGS. 1A and 1B above), such as node 150 name and peer routes associated with the node 150; local endpoint data (which may indicate direct connections to the node 150 and may be adjusted as connections change), such as endpoint name and endpoint type; and/or all endpoint data (which may be data about all connections between all nodes 150 and may be adjusted as connections change), such as node 150 name and endpoint name. In some embodiments, the individual nodes 150 may maintain and update this local data independently, without sharing with other nodes 150.

The hive table may be used to determine an order in which hives 320 will be contacted for connection. In some cases, a OPS 200 may connect to a network 300 for the first time and receive an initial table. In such cases, the OPS 200 may designate the first entry in the hive table it tries as its preferred hive 320. Thus, a preferred hive 320 may be the hive 320 in the hive table that has the first hive priority as determined by its rank in the table. This first entry may be selected randomly, non-randomly, or by an operator or administrator. In some other cases, the OPS 200 may have connected to the network 300 before and may already have a table. In such cases, the OPS 200 may start every connection attempt by trying to connect to its primary hive 320. Administrators or operators may adjust connection orders, assign hives 320 as primary hives, and/or otherwise alter the hive table.

Looking up data in a hive table may begin with a check 406 to determine if a hive table is available to the OPS 200. If no table is available, for example because the OPS 200 is attempting to connect to the network 300 for the first time, the OPS 200 may connect to some known or supplied initial IP address and port 408. For example, the OPS 200 may use DNS to resolve an IP address of a node 150. In some embodiments, special DNS facilities may be employed to recommend a node 150 to try first. The OPS 200 may determine whether the connection was successful 410. As seen in FIG. 4B, if it was, the OPS 200 may determine 412 whether the node 150 to which it is connected is a node 150 of the network 300 to which the OPS 200 was trying to connect. If the OPS 200 determines it is not connected to a node 150 of the network 300 to which it was trying to connect, the OPS 200 has connected to some other computer (for example a server on a different network or a stand-alone OPS 200 that is not part of a node 150), but nevertheless the OPS 200 may determine that a connection is made and ready for communication 414. If the OPS 200 determines that it is connected to a node 150, it may proceed to determine whether a redirect flag is set 436. This action and subsequent actions will be described in greater detail below.

Returning to FIG. 4A, if the check 406 described above reveals that a hive table is available, the OPS 200 may next determine whether it has made a copy of the table 418. If it has not, it may make a copy of the table 420 and it may store the copy on any storage medium. Next, the OPS 200 may determine whether a hunting give up flag has been set 422. A hunting give up flag may be a Boolean flag indicating that the OPS 200 has attempted to connect to all possible nodes 150 in the hive table. If the flag is set, the OPS 200 has tried all possible connections. If not, there are more connections to try. If the flag is not set, the OPS 200 may try to connect to the node 150 indicated as the next connection in the table 424, which may be any of the listed nodes 150. If the flag is set, the OPS 200 may attempt to connect to some known or supplied IP address and port, for example an address listed in a DNS entry. The OPS 200 may also clear unsuccessful connections from its saved table copy 426. Whether the OPS 200 attempts to connect to a connection in the table 424 or attempts to connect to a specified address 426, the OPS 200 may next determine whether the connection was successful 410. If it was, the OPS 200 may determine 412 whether the node 150 to which it is connected is a node 150 of the network 300 to which the OPS 200 was trying to connect. If the OPS 200 determines it is not connected to a node 150 of the network 300 to which it was trying to connect, the OPS 200 has connected to some other computer (for example a server on a different network or a stand-alone OPS 200 that is not part of a node 150), but nevertheless the OPS 200 may determine that a connection is made and ready for communication 414. If the OPS 200 determines that it is connected to a node 150, it may proceed to determine whether a redirect flag is set 436 (see FIG. 4B). This action and subsequent actions will be described in greater detail below.

Whether the check 406 found a hive table or not, the OPS 200 may proceed similarly if its connection attempt failed 410. The OPS 200 may determine whether the attempted connection was a node 150 connection 416. If not, the OPS 200 may connect to the known or supplied initial IP address and port 408. If the attempted connection was to a node 150, the OPS 200 may mark its hive table entry for that node 150 as unsuccessful 428, for example by setting a "connection unsuccessful" flag in the table entry for that node 150 so the OPS 200 may try a different node 150 connection in its next attempt. Next, the OPS 200 may determine whether connections to all nodes 150 in the table have been attempted 430. If not, the OPS 200 may choose 432 another node 150 in the table, set the next connection to that node 150, and start attempting to connect to it 402 and continuing with the process described above. The selection of the next node 150 to try may be random or it may be based on some criteria or logic. If the OPS 200 has tried connecting to every node 150 in the table 430, it may set the hunting give up flag to true 434, reset unsuccessful hive table entries, and then restart the connection process 402. In some cases, the OPS 200 may restart the process by using DNS to resolve an IP address of a node 150, thus behaving as though it is connecting to the network 300 for the first time.

The OPS 200 may determine 412 whether the node 150 to which it is connected is a node 150 of the network 300 to which the OPS 200 was trying to connect. Returning to FIG. 4B, if the OPS 200 determines 412 that it is connected to a node 150 of the network 300 to which it was trying to connect, the OPS 200 may check to see if a redirect flag is set 436. If so, the OPS 200 may reset the redirect flag and delete its hive table copy 468. The OPS 200 may reset the redirect flag because a set redirect flag may indicate that the OPS 200 has been told to redirect before, been unsuccessful in connecting to other computers, and returned to a node 150 with which it has established a connection. The OPS 200 may avoid redirection in such a situation. Then the OPS 200 may determine that its connection is active and ready 414.

The following actions in the process 400 may help to facilitate load balancing for the network 100. A OPS 200 that has established a connection to a node 150 in a hive 320 may be ordered to disconnect from the current node 150 and connect to a less busy node 150 if one is available. A OPS 200 that has established a connection to a hive 320 that is not the preferred hive 320 may attempt to connect to the preferred hive 320. If the OPS 200 cannot establish a connection to the preferred hive 320 (for example because the hive 320 has no nodes 150 with available connections), the OPS 200 may move to the next hive 320 in its table.

If the redirect flag is not set 436, the OPS 200 may receive updated hive table information from the node 150 and merge the updated information with the OPS's 200 stored hive table information 438. The OPS 200 may check to determine whether it has a preferred hive 440. A preferred hive may be a hive to which the OPS 200 will try to connect by default. A preferred hive may be a primary hive designated randomly as described above, it may be designated based on geography, it may be selected manually by an administrator, or chosen in some other way. In some cases, a preferred hive may be designated based on network 300 traffic, such that traffic is balanced across the nodes 150 of the network 300. Preferred hives may be designated for various OPSs 200 such that a plurality of available hives 320 are preferred hives for some OPSs 200, but no individual hive 320 is a preferred hive for too many OPSs 200 (depending on bandwidth, hive 320 capacities, and/or other variables). If the OPS 200 does not have a preferred hive, it may request information from the node 150 about the hive 320 with which the node 150 is associated 442. The OPS 200 may designate this hive 320 as the preferred hive and populate its hive table with updated information about other hives 320.

Whether the OPS 200 already has a preferred hive or designated one 442, the OPS 200 may next check to determine whether its hive priority list contains all hives 444 and may set a current hive variable to the preferred hive value 446. A hive priority list may be a part of the hive table, for example the first one or more entries in the hive table. The preferred hive 320 may be the first entry in the hive table (and therefore the hive priority list), and other hives 320 may be ranked in priority after the preferred hive 320 based on their order in the list. Turning to FIG. 4C, the OPS 200 may request information about a node 150 that is associated with its preferred hive 448. The node 150 to which the OPS 200 is connected may supply information about the node 150 associated with the preferred hive, such as a number of active connections and/or a number of available connections for the node 150, and the OPS 450 may determine whether the hive 320 is empty (an empty hive 320 may be a hive 320 with no nodes 150 available for connection). If the node 150 is empty, the OPS 200 may mark all remaining nodes 150 in the current hive 320 as unsuccessful in its hive table 452. The OPS 200 may identify a next untested hive 320 in its table 454. If the table is not exhausted 456, the OPS 200 may make the current hive 320 value the next hive 320 in the priority list 458 and request a node 150 for that current preferred hive 448. If the table is exhausted 456, the OPS 200 may reset the redirect flag, delete its hive table copy 468 (see FIG. 4B), and recognize that its connection is ready for communication 414.

If after requesting information about a node 150 that is associated with the preferred hive 448, the OPS 200 determines that the provided next node 150 is not empty 450, the OPS 200 may determine whether the preferred node 150 in its copy of the hive table is marked as not successful 460. If so, the OPS may determine whether there are any more nodes 150 in the hive 320 to try 462. If not, the OPS may find the next untested hive 320 in its table 454. If so, the OPS 200 may set its next connection to the preferred node and set its redirect flag 466. If not, the OPS 200 may determine whether it is connected to its preferred node 464. If not, the OPS 200 may set its next connection to the preferred node and set its redirect flag 466. The OPS 200 may be instructed by the node 150 to which it is connected to disconnect. Then the OPS 200 may close its connection 470 and restart the process 402. If the OPS 200 is connected to its preferred node 464, the OPS 200 may reset its redirect flag, delete its hive table copy 468 (see FIG. 4B), and determine that its connection is ready for communication 414.

Note that, as seen in FIG. 4B, a connection may be lost or terminated 470 for any reason (i.e. according to the processes described above, lost physical connection, communications problem, voluntary termination by user, etc.). Any connection loss 470 may restart the process 402, either immediately or when connectivity is restored. In some cases, when a connection is lost 470, the node 150 to which the OPS 200 had been connected may be marked as unsuccessful, so that the OPS 200 may try to reconnect to a different node the next time the OPS 200 attempts a connection.

If for any reason a OPS 200 has achieved a stable connection to the network 300 but is unable to reach its preferred node 150, its stable connection may be maintained. A notification may be generated by a computer within the network 300, so that an administrator is aware of the problem, but the system may prioritize active connections over preferred connections if those preferred connections are unavailable. This may prevent situations wherein a OPS 200 repeatedly has a stable connection interrupted when its preferred node 150 is unavailable for connection.

In some embodiments, administrators and/or settings may mark a hive 320 or hives 320 as premium hives. Hives 320 may be considered premium for individual OPSs 200 or across the entire network 300 or any subset thereof. A premium hive may be a hive 320 that does not appear in a hive table that is received by a OPS 200 upon connection to the network 300. The OPS 200 (or a user or administrator) may have knowledge of the premium hive connection information (i.e. IP address and port or DNS address) and may use that to connect. The premium hive may be added to a hive table manually, by the OPS 200, or upon actual connection of the OPS 200 to the premium hive.

Network 300 administrators or others may also be able to manually restrict or allow access to various hives 320 by various OPSs 200 based on any criteria. For example, an administrator can prevent a large number of OPSs 200 from migrating a connection to a minor hive 320 that cannot handle a large load by hiding the minor hive 320 from one or more OPSs 200.

In some embodiments, a OPS 200 may try to connect through a private network to a network 300 such as that described herein. In some cases the OPS 200 may be behind a firewall, for example. A node 150 may be placed behind the firewall and may have permissions with the firewall enabling connection to the network 300. The OPS 200 may connect to the node 150 behind the firewall and thereby reach the larger network 300. In some other cases, an entire network 300 such as the one described herein may be all or part of a private network such as a private long haul MPLS network, for example (as opposed to a large scale network like that of FIGS. 3A-3C or the Internet, for example). A OPS 200 may connect to a node 150 on the private network in similar fashion to the process 400 described above.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, while the above examples are presented in the context of OPSs 200 connecting to nodes 150, it will be understood that the systems and methods described herein can be performed by any interconnected computers. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for connecting to a network comprising a plurality of nodes wherein each of the plurality of nodes is associated with one of a plurality of hives, the method comprising: establishing, with a computer, node data for each of the plurality of nodes, the node data indicating a hive with which the node is associated and including a flag indicating whether a connection attempt associated with the node is or has been unsuccessful; determining, with the computer, a preferred hive, wherein the determining is based on the node data and/or a designation of a preferred hive stored in a memory; attempting, with the computer, to connect to one of the plurality of nodes that is not flagged as unsuccessful via a network connection when less than all of the nodes within the plurality of nodes are flagged as unsuccessful; marking, with the computer, the flag for the one of the plurality of nodes as unsuccessful when the connection attempt is unsuccessful; determining, with the computer, whether the node to which the computer is connected is a preferred node associated with the preferred hive when the connection attempt is successful, wherein the determining is based on the node data; determining, with the computer, whether a node associated with the preferred hive is not marked unsuccessful when the node to which the computer is connected is not the preferred node associated with the preferred hive; connecting, with the computer, to the preferred node associated with the preferred hive when the node to which the computer is connected is not the preferred node associated with the preferred hive and the preferred node associated with the preferred hive is not marked unsuccessful; receiving, with the computer, a command from the node to which the computer is connected, the command comprising an instruction to disconnect from the node to which the computer is connected; disconnecting, with the computer, from the node to which the computer is connected, and marking, with the computer, the node to which the computer is connected as unsuccessful; establishing, after disconnecting, with the computer, node data for each of the plurality of nodes; determining, with the computer, the preferred hive, wherein the determining is based on the node data and/or a designation of a preferred hive stored in a memory; attempting, with a computer, via a network connection, to connect to one of the plurality of nodes that is not flagged as unsuccessful, when less than all of the nodes within the plurality of nodes are flagged as unsuccessful; marking, with the computer, the flag for the one of the plurality of nodes as unsuccessful when the connection attempt is unsuccessful; determining, with the computer, whether the node to which the computer is connected is a preferred node associated with the preferred hive when the connection attempt is successful, wherein the determining is based on the node data; determining, with the computer, whether a node associated with the preferred hive is not marked unsuccessful when the node to which the computer is connected is not the preferred node associated with the preferred hive; and connecting, with the computer, to the preferred node associated with the preferred hive when the node to which the computer is connected is not the preferred node associated with the preferred hive and the preferred node associated with the preferred hive is not marked unsuccessful.

* * * * *